United States Patent
Kretschmann

(10) Patent No.: US 8,978,460 B2
(45) Date of Patent: Mar. 17, 2015

(54) METHOD FOR OPERATING A TIRE PRESSURE MONITORING SYSTEM FOR A MOTOR VEHICLE, TIRE PRESSURE MONITORING SYSTEM AND MOTOR VEHICLE

(75) Inventor: Matthias Kretschmann, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 12 days.

(21) Appl. No.: 14/001,246

(22) PCT Filed: Feb. 21, 2012

(86) PCT No.: PCT/EP2012/052932
§ 371 (c)(1),
(2), (4) Date: Aug. 23, 2013

(87) PCT Pub. No.: WO2012/113789
PCT Pub. Date: Aug. 30, 2012

(65) Prior Publication Data
US 2013/0327136 A1    Dec. 12, 2013

(30) Foreign Application Priority Data
Feb. 23, 2011   (DE) .......................... 10 2011 004 561

(51) Int. Cl.
*B60C 23/02* (2006.01)
*B60C 23/04* (2006.01)

(52) U.S. Cl.
CPC ......... *B60C 23/0416* (2013.01); *B60C 23/0415* (2013.01); *B60C 23/0488* (2013.01)
USPC .......................... 73/146.5; 340/444; 340/447

(58) Field of Classification Search
USPC .................................................. 73/146–146.8
See application file for complete search history.

(56) References Cited

U.S. PATENT DOCUMENTS

| 5,808,190 A | * | 9/1998 | Ernst ............................. 73/146.5 |
| 6,591,671 B2 | * | 7/2003 | Brown .......................... 73/146.5 |
| 7,775,098 B2 | | 8/2010 | Gila et al. |
| 7,866,206 B2 | * | 1/2011 | Achterholt ................... 73/146.5 |

(Continued)

FOREIGN PATENT DOCUMENTS

| DE | 10144360 A1 | 4/2003 |
| DE | 1022314 A1 | 12/2003 |

(Continued)

*Primary Examiner* — Andre Allen
(74) *Attorney, Agent, or Firm* — Laurence A. Greenberg; Werner H. Stemer; Ralph E. Locher

(57) ABSTRACT

A method of operating a tire pressure monitoring system for a motor vehicle includes detection of a stationary state of the motor vehicle by way of a centrifugal force measured on the wheel side or a vehicle speed measured on the vehicle side, during a time period during which the vehicle speed is zero; detection and vehicle-side storage of an acceleration force in each wheel during the time period, and renewed detection of an acceleration force in each wheel at the end of the time period. The detected acceleration force in each wheel is transmitted to a vehicle-side control device and compared with earlier-stored acceleration forces associated with the respective wheel position. The tire pressure system is initialized following the stationary state of the motor vehicle in the event of a deviation in any of the wheels. There is also provided a tire pressure monitoring system and a motor vehicle.

10 Claims, 4 Drawing Sheets

(56) References Cited

U.S. PATENT DOCUMENTS

| | | |
|---|---|---|
| 8,362,897 B2 | 1/2013 | Fink et al. |
| 8,528,393 B2 * | 9/2013 | Craig et al. ............... 73/146 |
| 8,584,517 B2 * | 11/2013 | Strahan .................. 73/146.5 |
| 8,723,662 B2 * | 5/2014 | Watabe et al. ............. 340/447 |
| 8,836,495 B2 * | 9/2014 | Maehara et al. ............. 340/444 |
| 2004/0021562 A1 | 2/2004 | Prenninger |
| 2010/0300192 A1 | 12/2010 | Isomura |
| 2013/0222128 A1 * | 8/2013 | Watabe et al. ............. 340/447 |
| 2014/0008132 A1 * | 1/2014 | Kamamann et al. ............. 177/1 |

FOREIGN PATENT DOCUMENTS

| | | |
|---|---|---|
| DE | 10238571 A1 | 3/2004 |
| DE | 19618659 B4 | 10/2004 |
| DE | 102004042191 B3 | 2/2006 |
| DE | 102007007200 A1 | 8/2008 |
| DE | 102007046486 A1 | 4/2009 |

* cited by examiner

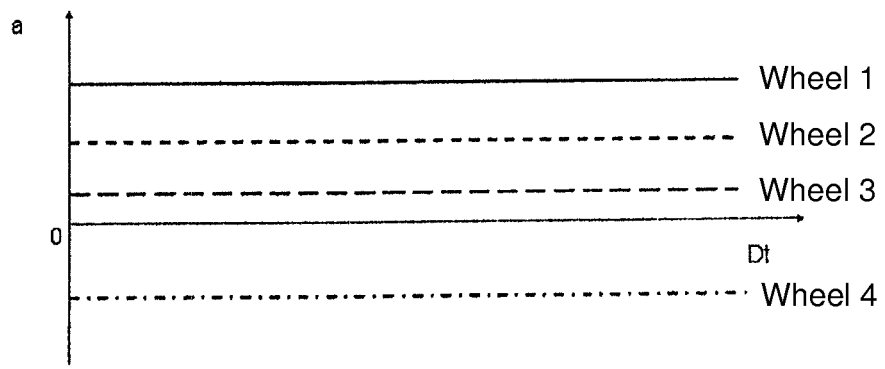
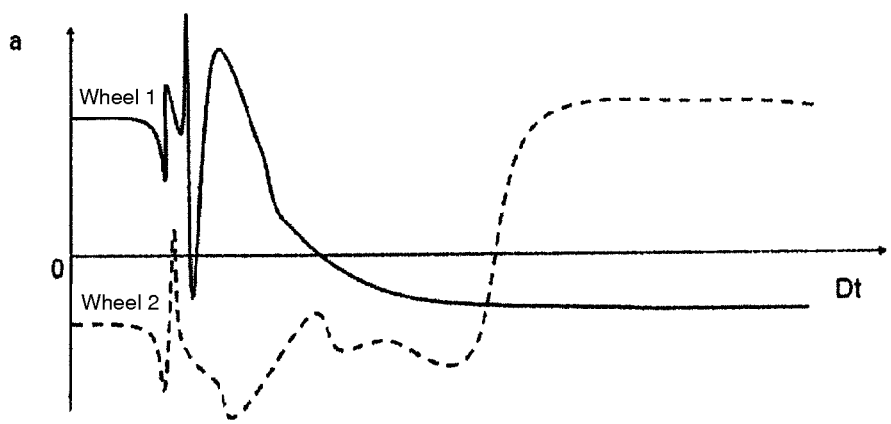

METHOD FOR OPERATING A TIRE PRESSURE MONITORING SYSTEM FOR A MOTOR VEHICLE, TIRE PRESSURE MONITORING SYSTEM AND MOTOR VEHICLE

BACKGROUND OF THE INVENTION

Field of the Invention

The invention relates to a method for operating a direct tire pressure monitoring system for a motor vehicle. The invention also relates to a tire pressure monitoring system for a motor vehicle and to a motor vehicle having such a tire pressure monitoring system.

Conventional direct tire pressure monitoring systems warn the driver about a loss of pressure and therefore provide greater safety. In addition, they also contribute to a reduction in $CO_2$ emissions. In such tire pressure monitoring systems, a sensor system is arranged in each wheel. This wheel-mounted or tire-mounted electronics system, referred to below as a wheel unit, typically communicates via a wireless communication link with an evaluation unit (also referred to as a central control device) which is fixed to the vehicle and comprises a receiver device.

The control device picks up data signals emitted by the wheel units and assigns them to a specific wheel sensor, using, for example, an identification code which is also transmitted.

A wide variety of methods are known for being able to assign the wheel unit mounted on each wheel or each tire to a specific wheel position of the wheel on the motor vehicle (for example front left, front right, rear left, rear right), these being, for example, DE 101 44 360 A1, DE 102 23 214 A1 or DE 10 2007 007 200 A1. Such an assignment, which is generally also known as wheel location determining process or in short as location determining process, typically takes place in the case of what is referred to as initialization after the switching on of the ignition or after the start of the vehicle. Without such assignment to a specific wheel position, it would otherwise remain unclear, for example owing to wheel changes, tire changes, fitting of new tires etc., at which wheel position the wheel unit, which is detected on the basis of its identification code, is located. However, such an unambiguous assignment is desirable and necessary both for evaluation and control processes within the vehicle and for the driver, for maintenance purposes etc.

So-called location determining process, i.e. the identification of the association of a received radio information item with a wheel, constitutes in practice a difficult challenge and also takes up a large amount of time. In conventional tire pressure monitoring systems, said location determining process is carried out whenever the vehicle starts, or shortly thereafter.

DE 10 2007 046 486 A1 describes a tire pressure monitoring system which automates the assignment of the position of the respective air pressure sensors, i.e. performs said assignment without separate engagement by a user, but this is also time-consuming. If a vehicle remains stationary for a relatively long time, for example, in the case of parking, the assignment starts anew, since basically the possibility exists of a tire or wheels having been replaced during the stationary state of the vehicle. For this reason, the system must be initialized anew in order to ensure that the correct tire positions are set by the tire pressure monitoring system, with the result that in the event of a fault, the faulty tire pressure is also displayed for the associated wheel position.

DE 10 2004 042 191 B3 describes a further tire pressure monitoring system in which the wheel units are localized. In this context, an acceleration sensor is used in the tire which can differentiate, given a constant vehicle speed, between the left/right wheel positions and the front/rear wheel positions. In this context, the acceleration sensor senses, on the basis of its installation position, the acceleration in the circumferential direction of the wheel. This makes it possible to determine the location of the respective wheel by evaluating the corresponding measured values. However, in such a tire pressure monitoring system the wheels must first be moving for the initialization/location determining process to be able to be carried out.

All the above-mentioned known tire pressure monitoring systems have in common the fact that a new unambiguous location determining process of the wheel units takes place whenever the motor vehicle is restarted or while it is travelling, said process typically lasting several minutes. However, during the location determining process no tire pressure measured values are evaluated. At least the associated wheel position cannot be unambiguously specified.

BRIEF SUMMARY OF THE INVENTION

Against this background, the object of the present invention is to be able to evaluate tire pressure values as quickly as possible after the restarting of a motor vehicle and to be able to assign said tire pressure values to a wheel position.

This object is achieved by means of a method having the features as claimed and/or by means of a tire pressure monitoring system having the features as claimed and/or by means of a motor vehicle having the features as claimed.

Accordingly, the following is provided:

A method for operating a tire pressure monitoring system for a motor vehicle, comprising the steps: the invention relates to a method for operating a tire pressure monitoring system for a motor vehicle, comprising the steps: detecting a stationary state of the motor vehicle by means of a centrifugal force measured on the wheel side and/or a vehicle speed sensed on the vehicle side for a time period during which the vehicle speed is defined as being zero; sensing and storing on the vehicle side at least one acceleration force at each wheel during the time period; renewed sensing of at least one acceleration force at each wheel at least at the end of the time period, wherein the sensed acceleration force at each wheel is transmitted to a vehicle-side control device and subsequently compared with the previously stored acceleration forces which are associated with the respective wheel position; initializing the location determining process of the tire pressure system after the stationary state of the motor vehicle in the case of a deviation of the newly measured acceleration forces from the previously stored acceleration forces for at least one wheel position.

A tire pressure monitoring system for a motor vehicle, having a vehicle-side control device which is configured to pick-up wheel-side signals, and evaluate and store them, having at least one wheel-side acceleration sensor which is respectively assigned to a wheel and is configured to measure acceleration forces acting on the wheel assigned to said acceleration sensor, and to transmit to the control device a signal which contains the measured values; the vehicle-side control device and the wheel-side acceleration sensors are further configured: to detect a stationary state of the motor vehicle during a time period during which the vehicle speed is defined as being zero, by means of a centrifugal force measured on the wheel side or a vehicle-side speed signal, to sense on the wheel side at least one acceleration force at each wheel during the time period and to store said acceleration force in the control device on the vehicle side, to sense again at least one acceleration force at each wheel (10) at least at the end of the time period and to transmit said acceleration force to the vehicle-side control device (23) in order to compare said acceleration force with the previously stored acceleration forces which are associated with the respective wheel position, and in the event of deviation of the newly measured acceleration forces from the stored acceleration forces to perform initialization of the tire pressure system at one wheel position in each case, after the stationary state of the motor vehicle.

A motor vehicle having a tire pressure monitoring system according to the invention, having a plurality of wheels which are each assigned at least one acceleration sensor of the tire pressure monitoring system.

According to the invention, an acceleration signal which is measured on the wheel side or a speed signal which is measured on the vehicle side is therefore used to detect a time period during which the vehicle speed is approximately zero and in which the motor vehicle is stationary. During this time period, one or more acceleration signals are then sensed at each wheel and stored on the vehicle side for each wheel position in the control device. At the end of the time period or in the meantime, one or more acceleration signals are sensed again at each wheel and said signals are compared with the previously stored acceleration signals. If the deviation of the newly measured signals from the previously stored signals is outside a tolerance value for one wheel position in each case, new initialization of the location determining process of the tire pressure system is performed at the restart or before the motor vehicle is started.

In this context, a stationary state of the motor vehicle is firstly detected by means of a wheel-side acceleration signal and/or by means of the speed signal of the motor vehicle. In this stationary state, the value of the wheel-side acceleration is sensed and stored. If the value of the acceleration deviates by more than a tolerance value from the set point value which is given by the measured acceleration when the stationary state starts, a wheel change or tire change is assumed. As a result, after the starting of the motor vehicle a new location determining process of the wheel units needs to be carried out only if a tire change has been assumed. Otherwise, no location determining process and no new initialization are required and the sensing of the tire pressure in the tires can start immediately, it being then also possible to assign the measured tire pressure values to the correct wheel position Advantageous embodiments and developments can be found in the further dependent claims and in the description with reference to the figures of the drawing.

In one advantageous embodiment, the acceleration forces are measured on the wheel side one or more times at chronologically long intervals during the time period. The acceleration forces are preferably measured continuously at a high sampling rate.

It is advantageous to sense the time profile of the acceleration signal during the stationary state of the motor vehicle in order to infer a tire change. Alternatively it is possible to measure only the angular opposition of the wheel by means of an acceleration signal one or more times during the time period of the stationary state, i.e. before the starting of the motor vehicle. The measured values are then compared with the stored values. If there is a correspondence within a tolerance limit, there is a very high probability that the wheels have not been moved during the stationary state.

Preferably only acceleration forces which act in the radial direction are measured on the wheel side.

The vehicle speed can be determined on the wheel side by means of the centrifugal force by means of the acceleration sensor which is present in any case in the tire or by means of the speed signal of the motor vehicle. A stationary state of the motor vehicle can therefore be sensed very reliably.

The above embodiments and developments can, where appropriate, be combined with one another as desired. Further possible embodiments, developments and implementations of the invention also comprise combinations which are not explicitly mentioned, of features of the invention which have been described previously or are described below with reference to the exemplary embodiments. In particular, the person skilled in the art can also add individual aspects as improvements or supplements to the respective basic form of the present invention.

The present invention will be described below in more detail on the basis of the exemplary embodiments which are specified in the schematic figures of the drawings, in which:

BRIEF DESCRIPTION OF THE SEVERAL VIEWS OF THE DRAWING

FIG. 4 shows static acceleration signals which have been measured on the wheel side during the stationary state, FIG. 5 shows dynamic acceleration signals which have been measured on the wheel side during the stationary state.

DESCRIPTION OF THE INVENTION

Figure 1:
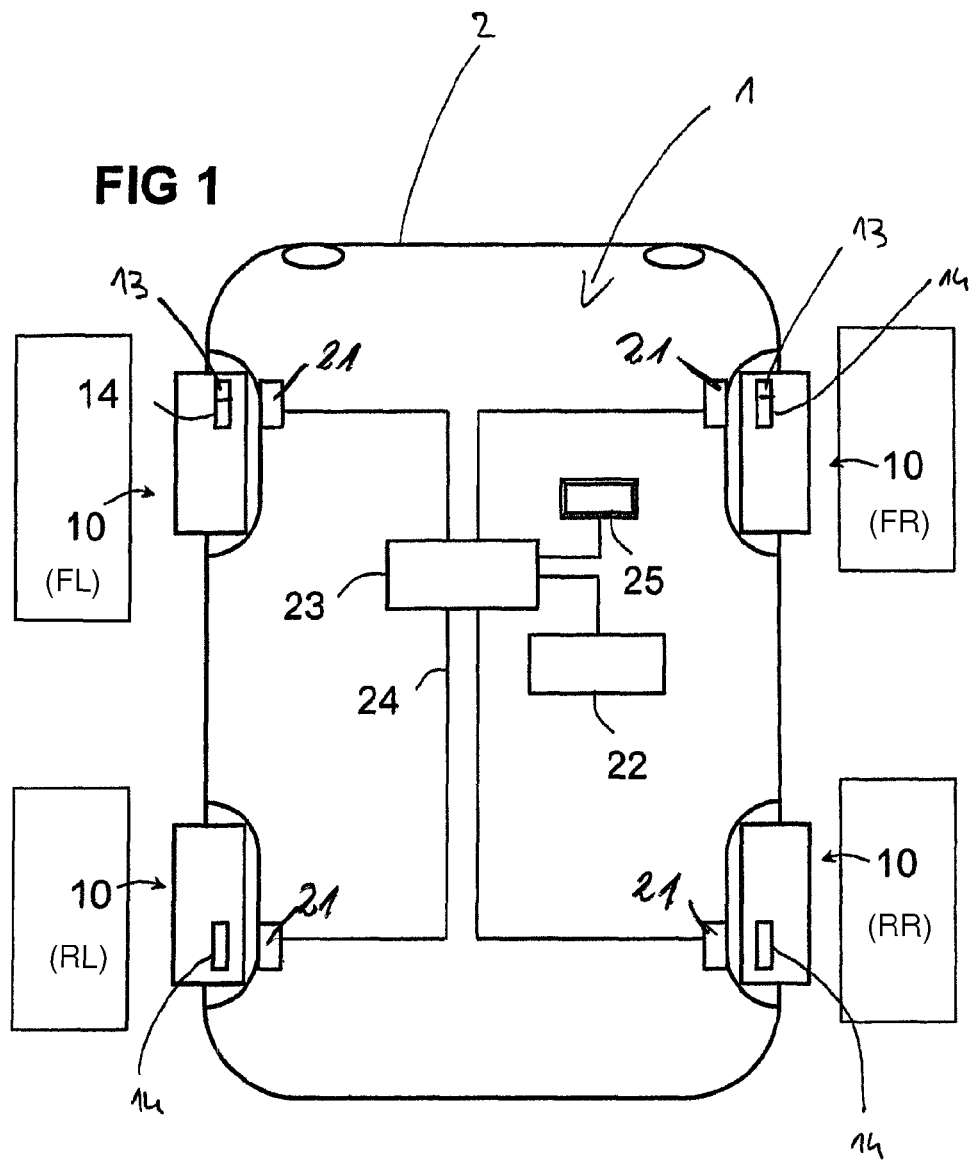
FIG. 1 shows a block circuit diagram of a tire pressure monitoring system according to the invention for a motor vehicle.

The appended drawings should facilitate better understanding of the embodiments of the invention. They illustrate embodiments and serve, in conjunction with the description, to explain principles and concepts of the invention. Other embodiments and many of the specified advantages are also apparent from the drawings. The elements of the drawings are not necessarily shown true to scale with respect to one another.

In the figures of the drawing, identical, functionally identical and identically acting elements, features and components are respectively provided with the same reference symbols, unless stated otherwise.

In the text which follows, the invention will be described in more detail with reference to the use in a motor vehicle as an exemplary embodiment. The tire pressure monitoring system can, of course, be used not only in wheels 10 of a motor vehicle but also of a motor bike, of a truck or of some other utility vehicle. It is also possible to monitor the tire pressure, correspondingly in aircraft wheels.

FIG. 1 shows a schematic block circuit diagram of a tire pressure monitoring system 1 according to the invention for a motor vehicle 2, with which physical wheel state variables or tire state variables, such as the tire pressure, the tire temperature, tire contact area, rotational speed, wheel speed and wheel acceleration of a motor vehicle wheel 10 are to be determined and to display said variables to the driver, if appropriate.

A vehicle wheel 10 usually has a rim 11 (see FIG. 2) with tires 12 fitted thereon. The tires 12 can be tubeless or else tubed. Such wheels 10 with corresponding tires 12 can be used with a variety of locomotion devices. In the text which follows, mention is made generally only of a wheel 10 (unless the tire 12 or the rim 11 or some other part of the wheel 10 is expressly meant).

The tire pressure monitoring system 1 according to the invention comprises a wheel-side wheel electronics system 14, vehicle-side transmitting/receiving devices 21 and a vehicle-side control device 23. The sensor element 13 is assigned to a wheel and is configured to measure wheel-specific or tire-specific physical characteristic variables such as, for example, the above-mentioned wheel state variables or tire state variables. The values which are measured in this way (referred to below as measured values) are transmitted by a transmitting device provided especially for that purpose within the wheel electronics system 14 to the vehicle-side receiving unit 21. Corresponding data and control signals are passed on from this vehicle-side receiving unit 21, via corresponding vehicle-side signal lines 24, for example a control bus and data bus, to a further-processing device 22, 23. This device 22, 23 is, for example, a vehicle-side control device 23 which typically has a transmitting and/or receiving unit, an evaluation unit, a control unit which has a computing unit etc.

The measured values can be transmitted from the vehicle-side transmitting/receiving device 21 to the control unit 23 which is arranged in the motor vehicle. The measured values can, if necessary, also be made available to any other control device in the motor vehicle provided that the measured values are "put" onto a data bus or data/signal lines 24. Conversely, measured values which are determined by other control devices 22 in the motor vehicle, for example the vehicle speed, can be communicated to the control device 23 if the control devices 22 are also connected to the data bus.

The vehicle-side wheel electronics system 14 can have various sensors (such as speed sensors), transmitting and receiving units and electronics system units.

The physical characteristic variables (tire pressure, centrifugal force, earth's gravitational traction force) of the wheels 10 can also be measured on the wheel side by means of a directly measuring method in the wheel 10. For this purpose, wheel electronics system 14, which can have sensor elements 13 (such as tire pressure sensor, temperature sensor, deformation sensor, acceleration sensor 18 etc.), transmitting and receiving units (not illustrated in the drawings) as well as electronic units including power supply in, in each case, one wheel 10, are arranged in the wheels 10. The sensor elements 13 directly measure different physical variables of the wheel 10 or of the tire 12, for example tire pressure, temperature, tire contact area length, acceleration and/or wheel load, and transmit the measured values to the motor vehicle for evaluation.

Such a wheel-side wheel electronics system 14 is located in each wheel 10 (front left (FL), front right (FR), rear left (RL) and rear right (RR)) which rotates during travel. The measured values are transmitted in a wireless fashion in a signal by means of antennas or in a contact-forming fashion to motor-vehicle-side receiving units.

However, it is advantageous here if the respective device in the wheel 10 are individually encoded, wherein in the control device 23 this encoding is assigned to a wheel position assigned to the wheel 10. This encoding, also referred to as tire-specific or wheel-specific identifier, is transmitted together with each measured value from the wheel 10 to a vehicle-side receiving device.

The assignment of the identifier of the wheel position can be first assigned or defined when initialization is first carried out. If each encoding or identifier is allocated a wheel position during the initialization, during the evaluation a wheel position can later be assigned to each wheel state variable determined from the measured values. It is therefore always known which wheel state variable is associated with which wheel position, and which physical variable originates from which wheel 10 (wheel position) or tire 12.

The initialization takes place after the ignition is switched on or, depending on the method, after the vehicle is driven away when a minimum speed is reached (higher than zero). Such initialization typically lasts approximately 3 to 8 mins.

The received signals are passed on to the control device 23 via signal lines 24 or a data bus. In said control device 23, all the data from all the wheel electronics systems 14 are evaluated. When situations which are critical for locomotion occur, if appropriate a corresponding vehicle-specific function can be controlled (either directly by the control device 23 or by means of a further control device 22 which is arranged in any case in the motor vehicle and controls other functions, such as, for example an engine control device or else ABS control device), as a function of the respectively determined wheel state variable. In addition, a visual or acoustic display unit 25 can be activated for the driver, as a result of which the driver is provided with such operationally relevant or safety-relevant information, and is therefore possibly also warned of an excessively low tire pressure in a tire 12.

So that initialization does not have to be carried out whenever the motor vehicle is restarted, according to the invention it is firstly determined whether a stationary state of the vehicle is present. It is then determined whether one or more wheels 10 have been moved during the stationary state. If the wheels 10 have not been moved, there is no need to perform any new initialization of the location determining process.

Before this is decided, a stationary state of the motor vehicle must firstly be detected. For this purpose, a speed signal which originates from a vehicle-side unit (for example from an engine control device or from the vehicle-side rotational speed signal generators) can be used. However, it is additionally or solely possible to evaluate a wheel-side signal. For example, an acceleration sensor 18 which is arranged in any case in each wheel 10 (FIG. 2) can be used for this purpose. The speed v can be determined from the measured centrifugal force F. For this purpose, the acceleration signal in one wheel or in all of the wheels 10 can be measured. A stationary state is present only if all the wheels 10 are stationary for a predefined time period (vehicle speed is approximately zero). However, the ignition does not necessarily have to be switched off in the stationary state.

Figure 2:
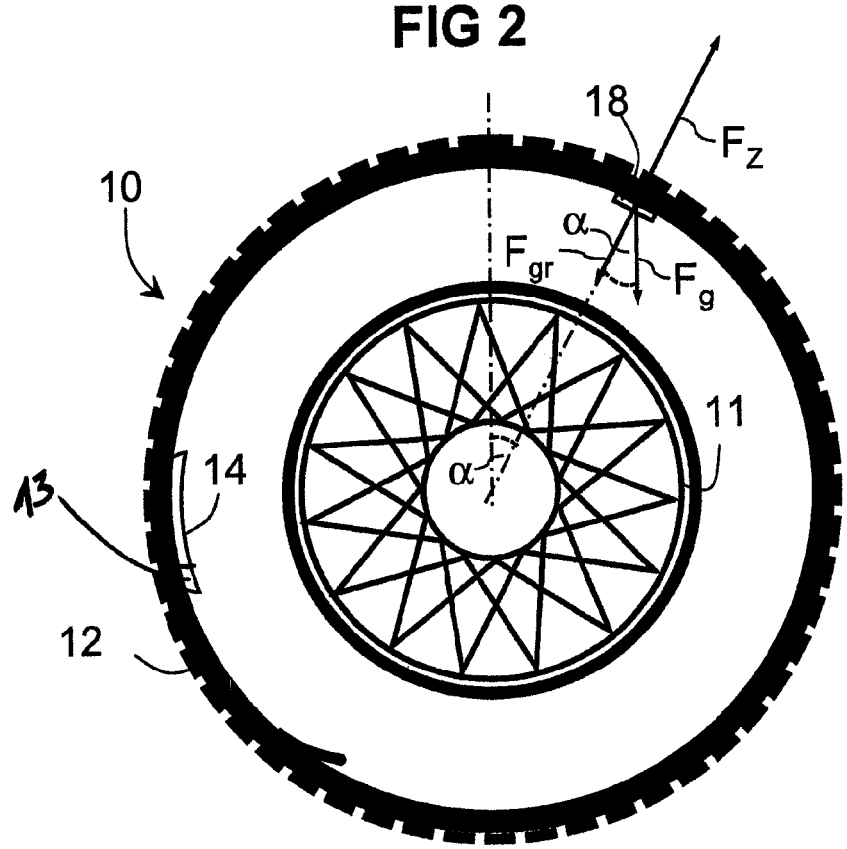
FIG. 2 shows a view of a wheel in which a wheel unit with an acceleration sensor of the tire pressure monitoring system according to the invention corresponding to FIG. 1 is arranged.

The acceleration sensor 18 can be arranged at a separate location in each tire 12 (as illustrated in FIG. 2) or can be arranged together with further sensor elements 13 in a common wheel electronics system 14 in each tire 12 or at each wheel 10. Such an acceleration sensor 18 typically measures the acceleration acting individually at each wheel 10, in at least one spatial direction. If the measuring direction is radial, on the one hand the centrifugal force $F_z$ is measured. In this context, the centrifugal force $F_z$ is always superimposed on the gravitational force $F_g$ since the latter is continuously active and the radial component $F_{gr}$ thereof results in sinusoidal shape as a function of the wheel position (wheel angle α). The radial component is the component of the gravitational acceleration vector projected on a wheel specific basis and is between −1 g and 1 g (g=gravitational acceleration). The acceleration sensor 18 must therefore be sensitive enough to be able to correctly measure both the low gravitational force (earth's gravitational force) and the high centrifugal force (up to 150 g) during travel or other acceleration forces (shocks) which act on the wheel 10. The other acceleration forces are usually greater than 1 g.

In this context, for example a commercially available micromechanical acceleration sensor 18 can be used which is sensitive in the radial direction, in order therefore to measure both the centrifugal acceleration ($F_z$) and the gravitational acceleration ($F_g$), along with other acceleration forces. However, only the radial component of these acceleration forces is ever measured unless the acceleration sensor 18 is sensitive in a plurality of spatial directions. In the second case, the direction of the force and the value thereof can be determined precisely.

Figure 3:
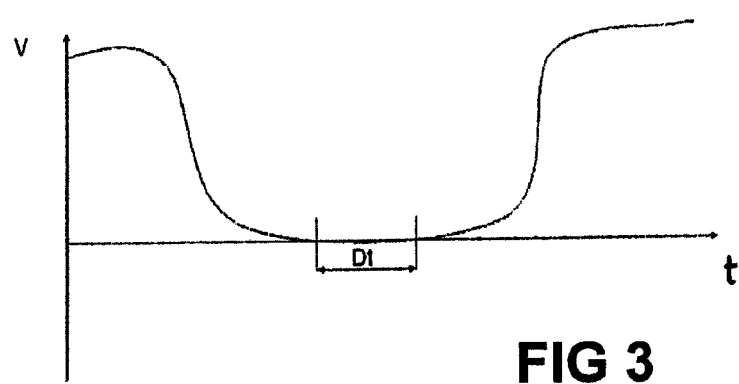
FIG. 3 shows a vehicle speed diagram for detecting a stationary state of the motor vehicle.

In order to detect a stationary state, the vehicle speed v is evaluated according to FIG. 3. Here, the speed signal v is derived from the centrifugal force $F_z$ measured by the acceleration sensor 18. A stationary state of the motor vehicle, during which a tire change or wheel change can in fact take place, is recognized by the fact that the vehicle speed v is reliably zero for a sufficiently long time interval $D_t$. In the case of an excessively short time interval $D_t$, the tires can hardly have been changed.

According to the invention, during the stationary state it is detected whether the wheels 10 have been moved. There are various detection possibilities for this.

If the time interval $D_t$ is shorter than a limiting value, there is a high probability that a tire change cannot have taken place since the time was too short for one. In such a case, it is assumed that the wheels 10 have not changed and are still located in the same position with the same wheel angle α as at the start of the stationary state. The last successfully carried out location determining process can then continue to be used as reliable information for the tire pressure monitoring system with a corresponding level of certainty, without more time being wasted. This is therefore significantly faster than would be required by re-initialization when the motor vehicle is restarted. In this case, the tire pressure monitoring system can evaluate tire pressure values from the beginning and, if appropriate, issue a warning to the driver without firstly having to initialize the tire pressure monitoring system.

If, on the other hand, the time interval $D_t$ is longer than this limiting value (minimum value), a tire change or wheel change could certainly have taken place. In order to be able to exclude a wheel change or tire change, the wheels 10 are monitored for movement during the stationary state. During this time, according to the invention the wheel angles α are monitored/determined at the beginning, if appropriate in the meantime and at the end of the time interval $D_t$ and/or the actual movement of the wheels 10 is sensed during the time interval $D_t$ by measuring the acceleration force $F_a$ which acts on the wheel 10 in the region of the acceleration sensor 18.

The necessary measurements for this are performed by each acceleration sensor 18 in each wheel 10 by the wheel-specific acceleration forces being measured intermittently at predefined time intervals.

FIG. 4 explains in more detail the exemplary embodiment in which the respective acceleration values a in each wheel 10 are measured during the time interval $D_t$ with relatively long time intervals. For example, the acceleration values can be measured at the beginning and at the end of the time interval $D_t$. The measured absolute values/values then depend only on the wheel angle α, i.e. on the respective angular position of each wheel 10 (wheel 1 to wheel 4), since the centrifugal force $F_g$ is zero. Each wheel 10 assumes a wheel angle α in the stationary state, specifically just as the wheel 10 became stationary. The four wheel angles α are typically different.

In the stationary state, respective acceleration values a are measured one or more times for each wheel 10 (wheel 1 to wheel 4) during the time period $D_t$. The measured values are transmitted, for example, from the wheel-side wheel electronics system 14 to the control device 23 where the values for each wheel 10 are stored. Each new measured value is compared for each wheel 10 with the corresponding, previously stored value. If a deviation of one or more values occurs outside a predefined tolerance limit, it is assumed that the respective wheel 10 has moved during the stationary state, since the wheel angle α has changed. Very small changes in all four wheels 10 together with the same order of magnitude can be excluded since the vehicle could have moved slightly forward or backward in the parked position, for example when parking on a gradient.

If at least one wheel angle α has changed, it is assumed that this wheel 10 has been removed and possibly replaced by another wheel 10. In the event of wheel change or exchange of a wheel, for example of the front left-hand wheel 10 (FL) by the front right-hand wheel 10 (FR), the two wheel angles would therefore typically change, unless the case were to occur, which is very improbable in practice, in which the two wheel angles α happen to be identical again after the change. As soon as a change in the wheel angle α is detected for one or more wheel positions, re-initialization of the location determining process is performed when the motor vehicle is next started, during which re-initialization encoding or an identifier corresponding to the individual wheel position is then allocated again to each wheel-side wheel electronics system.

During the sensing of the wheel angle α it is sufficient to sense in each case at least one acceleration value a of each respective wheel 10 during the stationary state (the time interval $D_t$) and to store it. When the ignition is switched on or when the motor vehicle is opened, an acceleration value a can then be sensed in turn for each wheel 10 and compared with the stored values. As a result, energy is saved compared to continuous measurement or intermittent measurement with chronologically longer intervals. Of course, the acceleration values a can also be sensed intermittently with time intervals which are short to a greater or lesser degree.

Alternatively or additionally, the actual acceleration values a can be measured frequently during the stationary state in a continuously intermittent fashion with quite short time intervals. However, the acceleration sensors 18 should then be sufficiently sensitive in order to be able to measure both small slow movements and large and rapid movements as acceleration values a.

In FIG. 5, the acceleration values a for two wheels 10 (wheel 1 unbroken line and wheel 2 dashed line) during the time interval $D_t$ are illustrated over time for the case in which a wheel change has taken place at the two wheels 10 during the time interval $D_t$. During the wheel change, the wheels 10 are interchanged in terms of their positions, for example the front right-hand wheel 10 is interchanged with the front left-hand wheel 10. For the sake of clarity the measured acceleration values a for the two other wheels 10 are not illustrated.

If the wheels 10 are not moved during the time interval $D_t$ (state of rest), the acceleration value a remains constant (first constant section for the curves of the acceleration values a corresponding to a constant wheel angle α). This is because here only the gravitational force $F_g$, which is dependent in terms of absolute value on the wheel angle α, since only the radial component $F_{gr}$ is measured in the radial direction, is effective. Firstly, a positive value for a radial component of the gravitational force $F_{gr}$ is measured for wheel 1 (depending on the instantaneous wheel angle α) and negative value is measured for wheel 2.

However, if a wheel 10 is moved, i.e. removed and carried to a different location, in addition to the constant gravitational force $F_g$ other acceleration forces $F_a$ (shocks) which can act in any direction also act and are superimposed on the gravitational force $F_g$. The acceleration forces $F_a$ can, depending on the movement, change to a greater extent or more quickly over time, as is illustrated by way of example in FIG. 5 by the smaller or larger deflections of the acceleration signal a in upward and downward directions.

If the wheels 10 are removed again and are stationary, the acceleration value a does not change any more and remains largely constant (last section of the acceleration values a in FIG. 5). Here, only the gravitational force $F_g$ then acts again, the measured absolute value of said gravitational force $F_g$ depending in turn only on the current wheel angle α. A large positive gravitational force $F_{gr}$ is then measured for wheel 2, and a small negative gravitational force $F_{gr}$ is measured for wheel 1.

During the continuous measurement of the acceleration values a, tolerance-induced measuring errors can remain excluded or be excluded etc., corrected, by means of mathematical methods such as mean value information or smallest or largest mean value outliers.

Movements (not only the rotational movement) or shocks of the wheels 10 can also be detected by the change in the acceleration signals over time. The causes of the variable acceleration values a may be the handling during assembly, which brings about chronologically limited acceleration. This rapid change in acceleration can be detected by a sufficiently high sampling rate of the acceleration sensor 18. On the other hand the orientation of the wheel 10/tire 12 with respect to the gravitational field of the earth (i.e. as a function of the wheel angle α) can usually change when the wheel 10 is taken off and mounted again at the same position or at a different position. As a result, it is also possible to detect whether a wheel 10 has moved during the time period $D_t$ by comparing the measured wheel angles α at the beginning of the time interval $D_t$ and at the end.

Both measuring methods can also be combined in order to be able to reliably detect or rule out a movement of the wheels 10. This rules out the possibility that the wheel change is detected as such even when there happens to be an identical wheel angle α (virtually never occurs) before and after a wheel change.

The wheel 10, as a rule, assumes a different wheel angle α after the change, with the result that a constant acceleration value a which is different from that before the wheel change is measured. Such a change can also be detected by a low sampling rate (long time intervals of minutes or hours) since the constant acceleration values a (corresponding to the corresponding wheel angle α) are present for longer or are constant during the stationary state of the motor vehicle.

If a change in the acceleration values a is therefore detected at least at a wheel 10, this change can be transmitted to the control device 23 via the wheel-side wheel electronics system. The control device 23 then brings about initialization when the motor vehicle is next started. Otherwise, it is not assumed that there is a wheel change or tire change and new initialization does not have to be carried out. The individual measured values can, however, also be sent directly to the control device 23. An evaluation to determine whether a change has taken place in the acceleration values a then takes place in the control device 23. The control device 23 then brings about initialization as a function of the result of the comparison.

It is not necessary to wait for new initialization only in cases in which a change in the wheel positions can be ruled out. This is because the last initialization with the correct location determination of the wheels 10 is still valid with a very high level of reliability. However, it is also possible to provide that new initialization is carried out only when changes in the acceleration values a have occurred during the stationary state at at least two wheels 10. As a result, it would then not be possible to carry out new initialization even in the event of a flat tire in which only the tire/wheel is taken off, the flat tire dealt with and the wheel 10 mounted again at the same wheel position, since despite the movement of a single wheel it is assumed that all the wheels 10 are at their previous wheel position. The fact that the wheel electronics system in the moved wheel is still the same can be determined and checked, for example by its unambiguous identification code.

If a wheel 10 is replaced by a new one or a tire 12 is replaced by a new tire 12, initialization must always take place since the new wheel 10 with its identifier is not known to the tire pressure monitoring system. This is because a new wheel 10 or tire 12 has a wheel electronics system which is not yet detected by the tire pressure monitoring system, and therefore initialization must always be carried out the first time.

Conventional and known mathematical methods such as standard deviation, variation, route means square RMS, difference formation, mean value formation etc. can be used to evaluate whether a change has taken place in the acceleration values a. Measuring errors can therefore be excluded from the determination of the movement of a wheel 10.

Only if it is detected that a wheel 10 has unambiguously moved during this stationary state, is new initialization to be performed. Otherwise, no initialization needs to be carried out after a stationary state. During the service life of the motor vehicle, stationary states of the motor vehicle in which no wheels 10 are changed occur significantly more often. In these cases, new initialization is carried out in conventional tire pressure monitoring systems after each vehicle start.

For this reason, with the tire pressure monitoring system according to the invention much time is saved, which would otherwise be used for new initializations after a stationary state. This also improves the safety and reliability since the tire pressure monitoring system is more quickly capable of being used. This is because in the vast majority of cases with the present tire pressure monitoring system the tire pressure values can be sensed from the beginning without initialization after a stationary state of the motor vehicle.

If initialization is performed, it can be performed with methods known from the prior art. Likewise, the methods for detecting the tire pressure or other wheel variables can be carried out in accordance with the known methods.

Where wheel-side or tire-side devices are mentioned, a location on the wheel 10 is meant irrespective of where precisely the object is arranged (inside or outside the tire 12, on the rim 11 etc.). The objects outside the wheel 10 but in the motor vehicle are referred to as vehicle-side (for example objects on the wheel arch in the vicinity of the wheels 10 or on the suspension strut).

The term "wheel angle α" is to be understood as referring to the position of a wheel 10 in terms of its angle. The wheel angle α is the angle between the vector of the vertical gravitational force $F_g$ and the radial line which leads from the central axis of the wheel 10 to the acceleration sensor 18. Since the acceleration sensor 18 is sensitive here only in the radial direction, only the force components or acceleration components in the radial direction are measured, for example the respective radial component of the constant gravitational force $F_g$ or the various acceleration forces which act on the acceleration sensor 18 (for example during the movement of the wheel 10).

The acceleration sensor 18 is arranged in each wheel 10, i.e. in the tire 12 or on the rim. Its measured values for the acceleration forces acting on the wheel 10 are transmitted to the vehicle-side control device 23 and evaluated there. It is advantageous if in any case an acceleration sensor 18 is already arranged in a wheel 10 or tire 12. This is because this acceleration sensor 18 can then be used to detect a movement of a wheel 10 during the stationary state of the motor vehicle. There is therefore no need for any additional hardware expenditure for the tire pressure monitoring system. Such acceleration sensors 18 can typically also be used for switching on the wheel electronics system 14 only when the wheels 10 are rotating, and therefore brings about a centrifugal force F. As a result, energy in the wheel electronics systems 14 is saved. The acceleration values a can be measured with the acceleration sensor 18 in the stationary state and remains stored there until they can be transmitted to the control device 23 by means of the wheel electronics system 14. The control device 23 then performs the evaluation of the acceleration signals a and the assessment as to whether or not initialization should be carried out.

Figure 6:
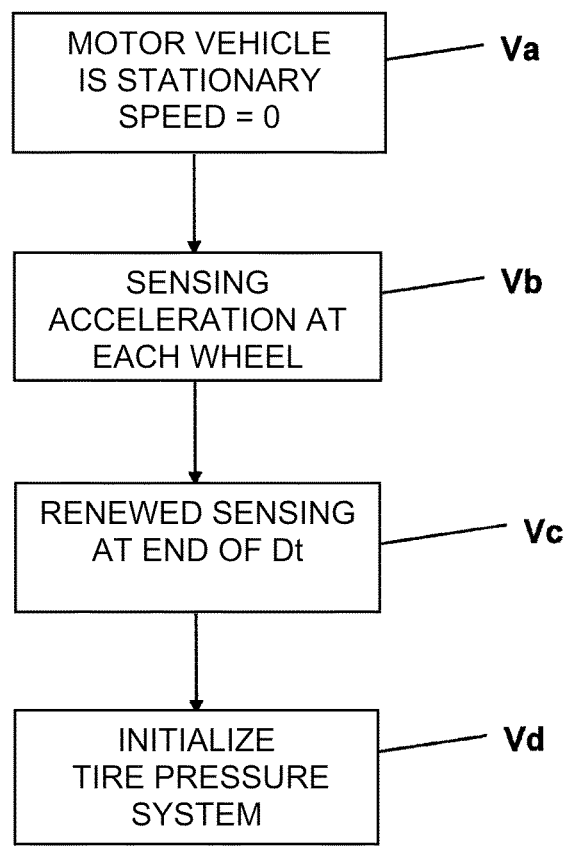
FIG. 6 shows a block circuit diagram for the method according to the invention for operating a tire pressure monitoring system for a motor vehicle.

FIG. 6 shows a block circuit diagram of the method according to the invention for operating a tire pressure monitoring system for a motor vehicle. The method comprises the following steps:

Step Va:

Detecting a stationary state of the motor vehicle by means of a centrifugal force $F_z$ measured on the wheel side and/or a vehicle speed v being sensed on the vehicle side. This is done during a defined time period $D_t$ during which the vehicle speed is defined as being zero.

Step Vb:

Sensing at least one acceleration force $F_g$, $F_z$, $F_a$ in each wheel 10 during the above-mentioned defined time period $D_t$. The sensed acceleration force $F_g$, $F_z$, $F_a$ is also stored on the vehicle side, for example in the vehicle-side control device.

In this context, the sensor typically measures only one acceleration component or a corresponding force which is composed of the secondary components of the force. For example, the acceleration force is composed of $F_a = F_{gr} + F_z + F_{external}$, wherein $F_{external}$ constitutes the force effect in the case of an active tire change. It is essential here that the individual secondary components of a measured acceleration component or force cannot be sensed separately. Only the actual acceleration component, for example of the acceleration force $F_a$ is sensed.

Step Vc:

Renewed sensing of at least one acceleration force $F_g$, $F_z$, $F_a$ in each wheel 10. The renewed sensing occurs here at least at the end of the time period $D_L$. The sensed acceleration forces $F_g$, $F_z$, $F_a$ are transmitted to a vehicle-side control device 23 and subsequently compared with the previously stored acceleration forces $F_g$, $F_z$, $F_a$ which are associated with the respective wheel position.

Step Vd:

Initialization of the tire pressure monitoring system after the stationary state of the motor vehicle in the case of a (predefined or predefinable) deviation of the newly measured acceleration forces $F_g$, $F_z$, $F_a$ from the previously stored acceleration forces $F_g$, $F_z$, $F_a$ at a respective wheel position.

LIST OF REFERENCE SYMBOLS

1 Tire pressure monitoring system
2 Motor vehicle
10 Wheel
11 Rim
12 Tire
13 Sensor element
14 Wheel-side wheel electronics system
18 Acceleration sensor
21 Vehicle-side wheel electronics system
22 Control device
23 Control device of the tire pressure monitoring system
24 Signal lines
25 Display unit
a Acceleration signal
α Wheel angle
$D_t$ Time interval
$F_a$ Acceleration force
$F_g$ Gravitational force
$F_{gr}$ Radial component of the gravitational force
$F_z$ Centrifugal force
t Time
v Vehicle speed
Va-Vd Method steps

The invention claimed is:

1. A method of operating a tire pressure monitoring system for a motor vehicle, the method which comprises:
   (a) detecting a stationary state of the motor vehicle by at least one of measuring a centrifugal force on a wheel side or sensing a vehicle speed on a vehicle side for a given time period during which the vehicle speed is defined as being zero;
   (b) sensing and storing on the vehicle side at least one acceleration force at each wheel during the given time period;
   (c) renewed sensing of at least one acceleration force at each wheel at least at an end of the given time period, transmitting the newly sensed acceleration force at each wheel to a vehicle-side control device, and comparing the newly sensed acceleration force with the previously stored at least one acceleration force associated with the respective wheel position; and
   (d) in case a deviation is determined of the newly measured acceleration forces from the previously stored at least one acceleration force for at least one wheel position, initializing the location determining process of the tire pressure monitoring system after the stationary state of the motor vehicle.

2. The method according to claim 1, which comprises measuring the acceleration forces on the wheel side one or more times at chronologically long intervals during the given time period.

3. The method according to claim 1, which comprises continuously measuring the acceleration forces at a high sampling rate.

4. The method according to claim 1, which comprises measuring only acceleration forces in a radial direction relative to the wheel on the wheel side.

5. The method according to claim 1, wherein step a) comprises using vehicle-side speed signals and/or centrifugal accelerations measured on the wheel side by an acceleration sensor to detect the stationary state of the motor vehicle.

6. A tire pressure monitoring system for a motor vehicle, the system comprising:
   a vehicle-side control device configured to receive wheel-side signals, to evaluate the signals, and to store the signals;
   at least one wheel-side acceleration sensor respectively assigned to a given wheel of the motor vehicle and configured to measure acceleration forces acting on the given wheel and to transmit a signal with measured values to said control device;

wherein said control device and said acceleration sensors are configured:

to detect a stationary state of the motor vehicle during a given time period during which a vehicle speed is defined as being zero, by way of a centrifugal force measured on the wheel side or a vehicle-side speed signal;

to sense on the wheel side at least one acceleration force at each wheel during the given time period and to store the at least one acceleration force by said control device on the vehicle side;

to sense at least one further acceleration force at each wheel at least at an end of the given time period and to transmit the further acceleration force to said control device, wherein the further acceleration force is compared with the previously stored at least one acceleration force associated with the respective wheel position; and in the event of a deviation of the further acceleration forces from the stored acceleration forces, to perform an initialization of the tire pressure system at one wheel position in each case, after the stationary state of the motor vehicle has expired.

7. The tire pressure monitoring system according to claim 6, wherein said acceleration sensor is mounted in or on an inside of a tire and wherein said acceleration sensor is sensitive only to acceleration forces in a radial direction.

8. The tire pressure monitoring system according to claim 6, which further comprises at least one vehicle-side speed sensor configured to sense a vehicle speed for detecting the stationary state of the motor vehicle.

9. The tire pressure monitoring system according to claim 6, wherein said acceleration sensor has a centrifugal acceleration sensor configured to sense a vehicle speed in order to detect the stationary state of the motor vehicle by sensing a centrifugal acceleration of a wheel assigned to the respective said acceleration sensor.

10. A motor vehicle, comprising:

a tire pressure monitoring system according to claim 6; and a plurality of wheels each having assigned at least one acceleration sensor of the tire pressure monitoring system.

* * * * *